United States Patent [19]

Lemaistre et al.

[11] Patent Number: 5,124,976
[45] Date of Patent: Jun. 23, 1992

[54] SYNCHRONOUS DIGITAL TRANSMITTER

[75] Inventors: Jacques Lemaistre, Argenteuil; Thierry Filoux, Colombes; Gérard Pezy, Soissy-sous Montmorency, all of France

[73] Assignee: Alcatel Business Systems, Paris, France

[21] Appl. No.: 560,669

[22] Filed: Jul. 31, 1990

[30] Foreign Application Priority Data

Aug. 2, 1989 [FR] France .................. 8910419

[51] Int. Cl.$^5$ .................. H04J 3/00
[52] U.S. Cl. .................. 370/29; 370/84; 370/110.1; 370/26
[58] Field of Search .................. 370/110.1, 104, 84, 370/112, 105.4, 105.5, 29, 26

[56] References Cited

U.S. PATENT DOCUMENTS

| | | | |
|---|---|---|---|
| 4,551,835 | 11/1985 | Bensadon et al. | 370/110.1 |
| 4,607,364 | 8/1986 | Neumann et al. | 370/110.1 |
| 4,847,833 | 7/1989 | Doering et al. | 370/85 |
| 4,953,180 | 8/1990 | Fienchi et al. | 370/110.1 |

*Primary Examiner*—Benedict V. Safourek
*Assistant Examiner*—Dang T. Ton
*Attorney, Agent, or Firm*—Sughrue, Mion, Zinn, Macpeak & Seas

[57] ABSTRACT

A synchronous digital transmitter connects a data terminal equipment to a multiservice digital PABX which accesses the public switched telephone network at 64 kbit/s. It includes a system for generating a frame clock defining a 64 kbit/s data transmission channel used for the transmission of data to and from the PABX. A further system generates a bit clock at the same frequency as the data from the terminal equipment for transfers to and from the terminal equipment. A further system periodically synchronizes the bit clock to the frame clock. The transmitter is applicable to the synchronous transmission of data at data rates up to 64 kbit/s.

7 Claims, 11 Drawing Sheets

SYNCHRONOUS DIGITAL TRANSMITTER

BACKGROUND OF THE INVENTION

1. Field of the invention

The present invention concerns digital transmitters for transmitting data between data transmission terminal equipments via a multiservice digital private automatic branch exchange (PABX) which has access to public networks and services; in particular, it has access at 64 kbit/s to the public switched telephone network and in this case is synchronized to the switched network.

2. Description of the prior art

Asynchronous digital transmitters are already in use, connected by a V.24 socket to a terminal equipment and operating at standardized data rates up to 19 200 bit/s. A digital transmitter of this kind transmits data over a digital link which connects it to a PABX in half-duplex asynchronous mode. This is described in an article entitled The multiservice automatic switching unit OPUS 4000 by M. BAUDIN, L. LE, J. R. MEJANE, F. SEVEQUE and P. ANIZAN published in the French Journal Commutation et Transmission No 4 1985. The transmitter and the PABX communicate by means of successive 125 µs frames. Each frame is made up of two messages, one transmitted to the transmitter and the other transmitted by the transmitter. The messages are identically constituted as follows:

one start bit,
one signalling bit for an 8 kbit/s signalling channel,
one data bit for an 8 kbit/s data channel,
eight speech bits for a 64 kbit/s speech channel,
one line balancing parity bit.

Each message is followed by a guard time made up of eight stop bits for the two messages of a frame.

This form of message allows simultaneous transmission of data and speech in the case of speech and data terminal equipments. As an asynchronous digital transmitter does not transmit speech it uses the 64 kbit/s speech channel to transmit data and the signalling channel for the dialogue between the PABX and the terminal. The start bit of the message sent by the PABX enables recovery of the 8 kHz system clock in the transmitter.

The message data has its data rate changed to match the standardized data rate of the terminal to the data rate of the line which carries the data, in both directions, terminating at the interface circuit of the terminal. This data rate change is effected through under-use of the 64 kbit/s transmission channel of the line and by using framing in accordance with CCITT Recommendation V.110 (equivalent to ECMA standard 102) carried out at the PABX for transmission of messages to a remote terminal equipment via the switched network.

For transmission over the line the messages are modulated with the DC component eliminated: logic "1" is not modulated, while logic "0" is alternately modulated as a positive and a negative level (+3 V, −3 V).

An object of the present invention is a synchronous digital transmitter for synchronous transmission of data between a multiservice digital PABX and various types of terminal equipment with varied standardized data rates up to 64 kbit/s.

SUMMARY OF THE INVENTION

The invention consists in a synchronous digital transmitter for transmitting data over a digital transmission line between a terminal equipment having a standardized interface circuit and a multiservice digital PABX accessing a public switched telephone network, the digital transmitter comprising:

a line interface circuit for modulating and demodulating digital signals transmitted on said line, a multiplexing circuit interfaced to the line interface circuit for multiplexing and demultiplexing signals in the various channels of the line for half-duplex exchange of messages within a 125 µs frame, one of said channels being a signalling channel and another being a 64 kbit/s data channel, means for producing a frame clock defining said 64 kbit/s channel of the line, means for processing data and signalling for their transmission in both directions to the PABX over the digital line and to the terminal equipment, in which digital transmitter:

at least a first socket is provided for selective connection to said transmitter of one of the V.24, V.35/V.24, X.21 interfaces of terminal equipments with different standardized data rates, means are provided for generating a bit clock at a frequency very slightly greater than that of the data from the terminal equipment connected to the transmitter and the rising edges of which control the transmission of data in one direction and the falling edges transmission of data in the other direction between the digital transmitter and the equipment, and means are provided for synchronizing said bit clock to said frame clock with a synchronization period derived from the data rate of the terminal equipment connected relative to the frame clock frequency, the corresponding edge of the bit clock being resynchronized relative to the frame clock in each synchronization period.

The characteristics and advantages of the present invention will emerge from the description of one embodiment shown in the appended drawings.

DETAILED DESCRIPTION OF THE INVENTION

Figure 1:
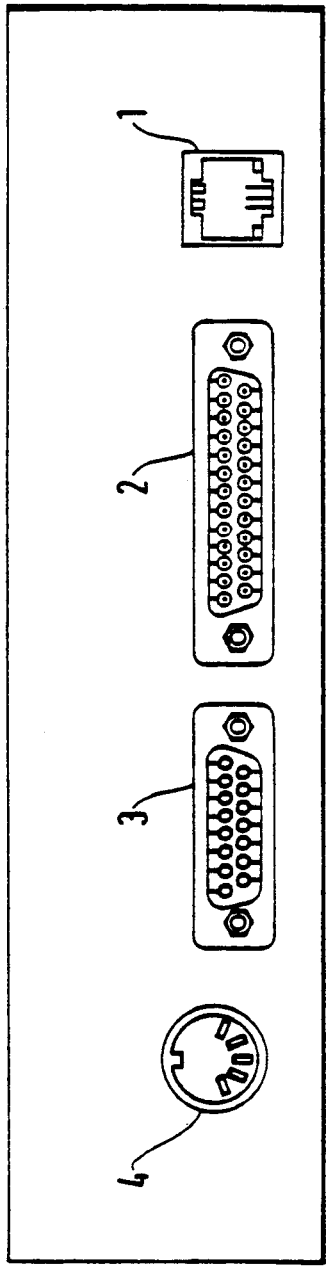
FIGS. 1 and 2 respectively show the back and front panels of a synchronous digital transmitter unit in accordance with the invention.
Figure 2:
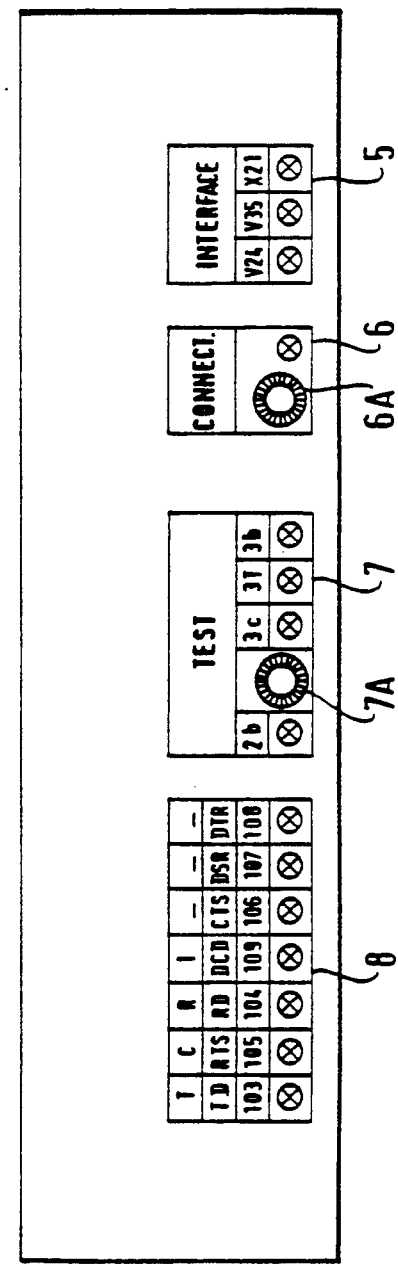

FIGS. 1 and 2 respectively show the back and front panels of a synchronous digital transmitter unit in accordance with the invention.

On its back panel the synchronous digital transmitter unit has a socket 1 for connection to a digital transmission line, two different sockets 2 and 3 for connection to a terminal equipment interface circuit which comply with CCITT Recommendations, namely Recommendation V.24 for socket 2 and Recommendation X.21 for socket 3, and a power supply socket 4.

The socket 1 is connected by a digital transmission line to a multiservice PABX such as the OPUS 300 or OPUS 4000 PABX. The sockets 2 and 3 are used to connect the unit selectively to a terminal equipment with a V.24 or X.21 interface circuit or with a V.35 interface circuit using a known V.35/V.24 interface converter. The socket 4 is used to connect an external power supply.

The front panel of the synchronous digital transmitter unit carries four light-emitting diode (LED) displays 5 through 8. The diodes are represented by the usual symbol for a lamp, but are not individually identified.

The display 5 shows the type of interface circuit connected to the socket 2 or 3; marked "INTERFACE", it comprises three diodes for the three possible interface circuit types: V.24, V.35, X.21.

The display 6 indicates that a link is established between this synchronous digital transmitter and another, analogous synchronous digital transmitter via the PABX; labelled "CONNECT" it comprises a single LED. It incorporates a switch 6A for the V.24 and V.35 interface circuits.

The display 7 shows various loopback modes to the terminal or to the PABX; labelled "TEST", it comprises four diodes for supervising three local loops towards the line at different levels, designated 3c, 3T and 3b, and a remote loop to the PABX implemented at a V.24 interface only and denoted 2b. A test switch or button 7A is associated with this display. It is used to initiate local loopback manually and to exit the loopback phase, by successive operations of the switch 7A, if the transmitter is not in connected mode (diode of display 6 off). It is also used to trigger manually the remote loop 2b and then to access this loopback phase by first and second operations of this switch with a V.24 interface when the transmitter is in connected mode.

Some of these loops can also be obtained automatically, using some interchange circuits of the V.24 interface.

The display 8 shows the status of various interchange circuits of the various V.24, V.35 and X.21 interfaces. The electrical characteristics of these interchange circuits comply with CCITT Recommendations V.28, V.28 and V.35 or V.11, as appropriate, and are denoted in the same way as they are referred to in these recommendations. This means the circuits denoted T, C, R, I, to which the same signal designations correspond, in the case of an X.21 interface. It means the circuits 103 through 109, to which the signal designations shown apply, in the case of the V.24 and V.35 interface circuits.

These signal names are summarised below, showing the direction of the signals:
C: Command, from terminal equipment to transmitter.
I: Indication, from transmitter to terminal equipment.
T or TD: Transmission of data from the terminal equipment to the transmitter.
RTS: Request to send from the terminal equipment to the transmitter.
R or RD: Received data from the transmitter to the terminal equipment.
DCD: Received line signal (data carrier) detection from the transmitter to the terminal equipment.
CTS: Clear to send data from the digital transmitter to the terminal equipment.
DSR: Data set ready to function from the transmitter to the terminal equipment.
DTR: Data terminal ready, from the equipment to the transmitter.

The display 8 comprises seven light-emitting diodes of which four are common to the interchange circuits T, C, R, I and to the interchange circuits 103, 105, 104 and 109.

Figure 3:
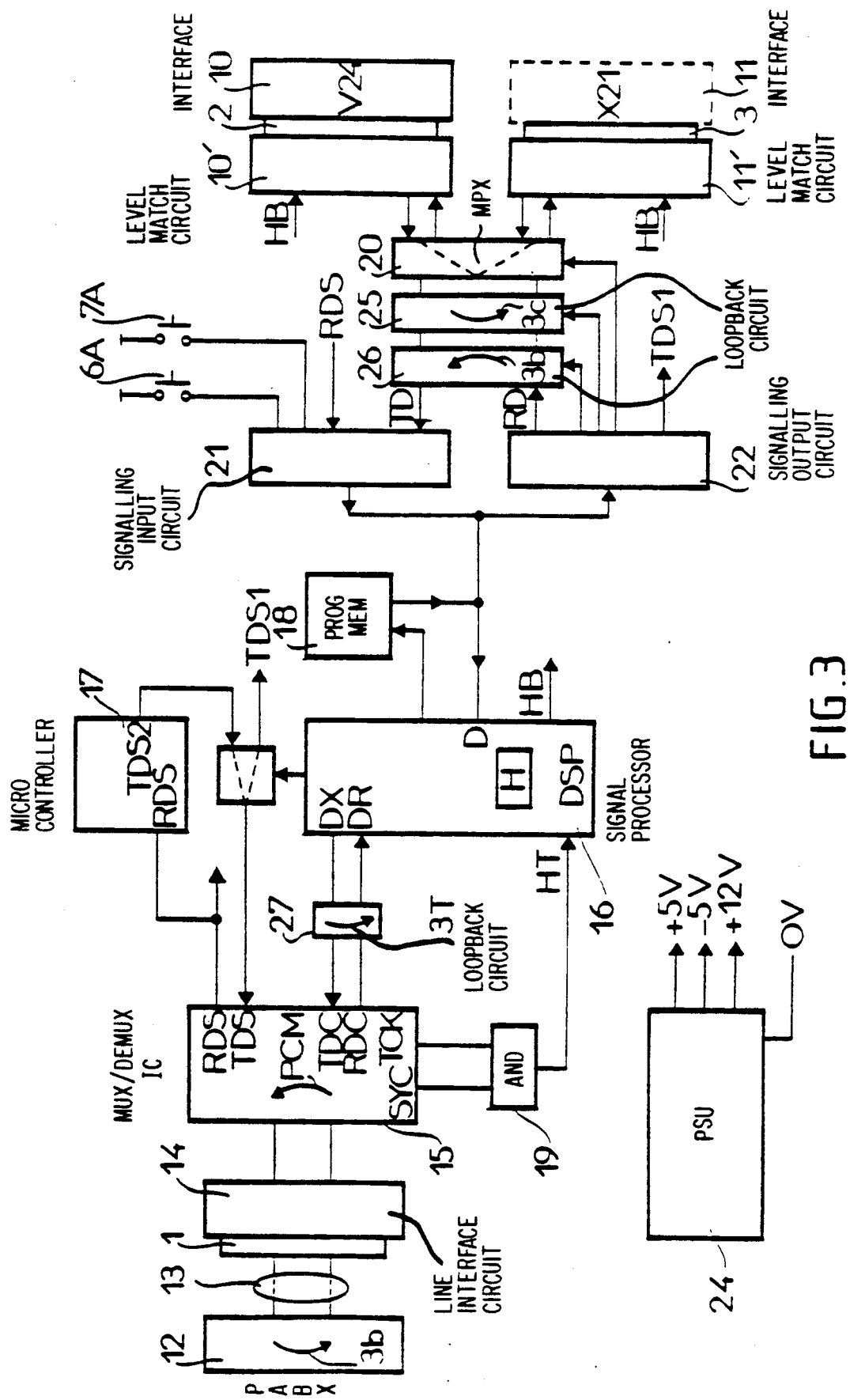
FIG. 3 is a block schematic of the synchronous digital transmitter in accordance with the invention in a subscriber installation.

FIG. 3 is a block diagram of the synchronous digital transmitter in accordance with the invention. It is shown connected to a terminal equipment V.24 interface 10 or to a terminal equipment X.21 interface 11. The interface 10 shown in full line and the interface 11 shown in dashed line reflect this selective connection via the corresponding connector 2 or 3 on the transmitter. The transmitter is also shown connected to a multiservice digital PABX 12 by a digital transmission line 13 connected to the socket 1.

The socket 2 can be used to connect a terminal equipment V.35 interface, using a known V.24/V.35 converter.

The PABX 12 connected to the synchronous digital transmitter is a multiservice digital PABX such as the OPUS 300 or 4000 PABX with access to public networks and services for connecting terminal equipments. It is synchronized to the 64 kbit/s public switched telephone network.

The synchronous digital transmitter comprises:
a line interface circuit 14 connected to the socket 1 which modulates and demodulates at 256 kHz digital signals transmitted in both directions on the line 13, with a null DC component,
a semi-custom integrated circuit 15 connected to the line interface circuit 14 which multiplexes and demultiplexes the digital signals transmitted on the line 13 into and out of the various digital transmission channels,
a signal processor (DSP) 16 connected to the semicustom integrated circuit 15 which manages the signalling bits (TDS1) when the digital transmitter is idle (in the so-called non-connected mode), the generation of a terminal equipment data transmit/receive clock HB, synchronization of this clock to the 8 kHz system clock provided by the PABX and framing in accordance with CCITT Recommendation V.110, a mask-programmed microcontroller 17 also connected to the semi-custom integrated circuit 15 and optionally incorporated in the processor 16 which manages the signalling bits (TDS2) when the transmitter is transferring data (in the so-called connected mode), program memories 18 connected to the processor 16, two level matching circuits 10, and 11, for the respective interfaces 10 and 11, connected to the sockets 2 and 3, a multiplexing circuit 20 connected selectively to theh level matching circuits 10, and 11, according to which interface 10 or 11 is connected to the socket concerned and routing data transmitted (TD) or received (RD) by the terminal, a signal input circuit 21 and a signal output circuit 22 controlled by the processor and transmitting between the terminal and the processor the data signals RD, TD, interface status information, loop commands, signalling transmission and reception signals and commands from the switches 6A and 7A.

An external power supply unit 24 connected via the socket 1 (FIG. 1) provides the appropriate supply voltages to the various transmitter circuits.

FIG. 3 also shows loopback circuits 25 and 26 between the multiplexing circuit 20 and the input and output circuits 20 and 21 for the aforementioned loops 3c and 2b, as shown by the arrows, and the loopback circuit 27 between the semi-custom integrated circuit 15 and the processor 16 for the 3T loop, as shown by the arrow. Arrows show the 3b loopback at the PABX and a so-called PCM loopback to the PABX effected in the semi-custom integrated circuit 15 and monitored by the PABX.

The following are shown on the processor 16:

two serial ports, DX for transmission of data and DR for reception of data, interfaced to the semi-custom integrated circuit 15, data transmit and receive ports D interfaced to the input circuit 20 and output circuit 21, an HT clock port for data to transmit on the line 13, the clock HT being obtained from the semi-custom integrated circuit 15 via an AND circuit 19, an HB clock port for data transmitted and received by the terminal equipment, the clock HB being generated by the processor and applied to the circuits 10' and 11' for controlling the stream of data terminating at the terminal.

The frame clock HT is generated by a combination of two signals from the semi-custom integrated circuit: a 256 kHz clock TCK and a synchronization pulse SYC which starts when the start bit of each frame received from the line is detected and which has a duration equal to eight periods of the previously mentioned 256 kHz clock. This clock HT, with a pulse duration corresponding to eight bits of each 125 μs frame transmitted on the line, defines the 64 kbit/s transmission channel connected to the serial ports DX and DR of the processor. It synchronizes these serial ports of the processor to the 8 kHz system clock. The clock HT is also used by the processor 16 to generate a serial interrupt (INT SER) after each reception of eight periods which define it and which correspond to the 64 kbit/s channel. The processing of these INT SER interrupts is described later.

The clock HB is derived in the processor 16 from a 40 MHz internal clock H.

The microprocessor generates from this internal clock H timer interrupts (INT TIM) at a frequency which is twice the data transmission frequency of the terminal equipment. Processing these timer interrupts creates alternately rising and falling edges of the clock HB. The clock HB is synchronized periodically to the clock HT by synchronizing the timer interrupts to the serial interrupts, as will be explained in more detailed later.

The processor 16 also handles the framing of data according to CCITT Recommendation V.110 or the equivalent ECMA standard 102. The framing depends on the standardized data rate of the terminal equipment connected to the transmitter. It is carried out during transfer of the data from the ports D to the serial port DX, while the converse process of deframing is carried out during the transfer of data from the serial port DR to the port D. This is also described in more detail later.

The software of the processor will now be described with reference to FIGS. 4 through 17.

Figure 4:
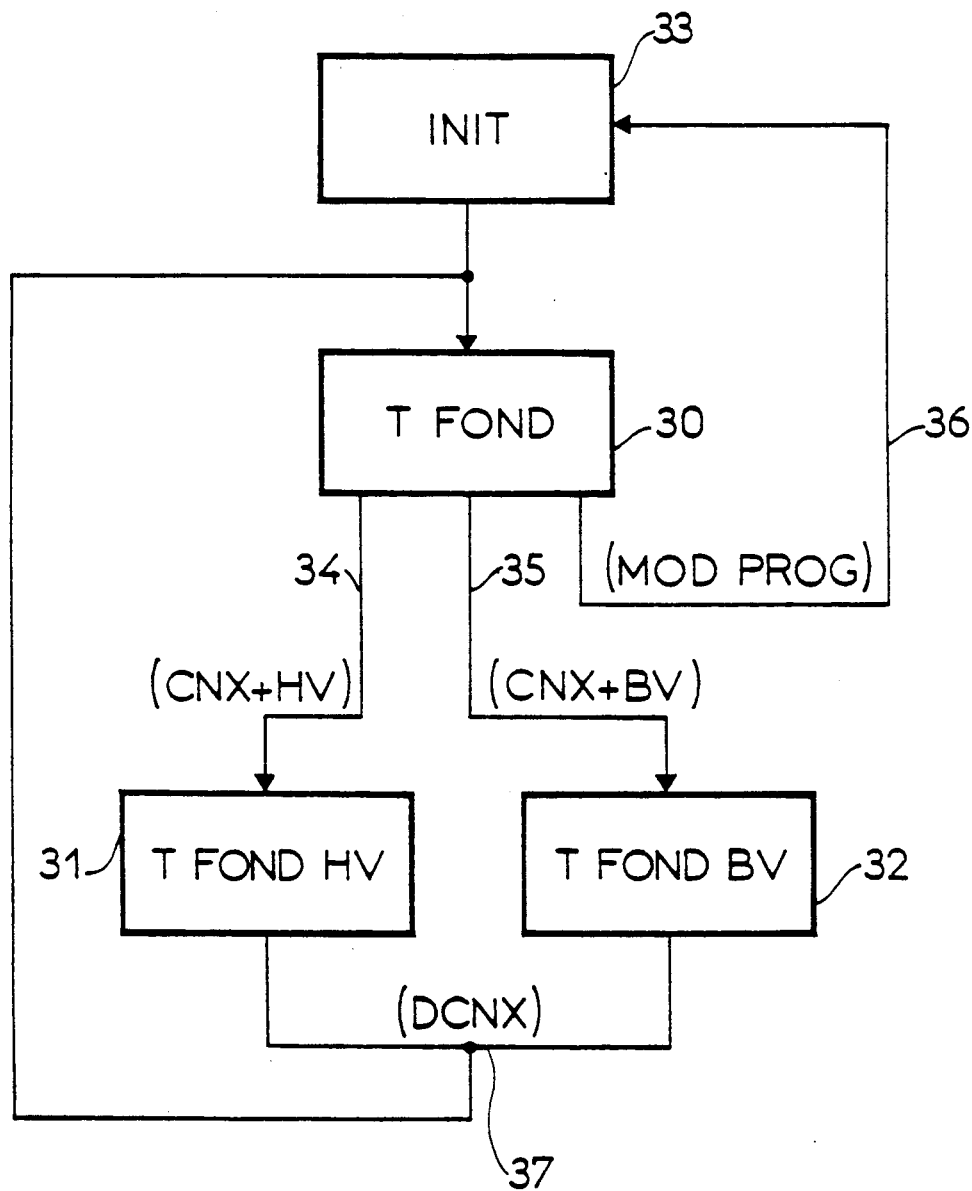
FIG. 4 shows the general organization of the processing software of the digital transmitter in accordance with the invention, consisting of linked main programs.

FIG. 4 shows that this software comprises three main programs or background task modules: a T FOND module 30, a T FOND HV module 31 and a T FOND BV module 32, together with an initialization program INIT 33.

The T FOND program is active when the synchronous digital transmitter is idle, in the non-connected mode.

The program T FOND BV is active when the synchronous digital transmitter is transferring data, in the connected mode, at a low data rate of the terminal equipment, in other words at a V.24 standardized data rate of 600, 1 200, 2 400, 4 800, 9 600 or 19 200 bit/s. The program T FOND HV is active when the digital transmitter is in the connected mode, at a high data rate of the terminal equipment, in other words at a V.35 or X.21 standardized data rate of 48, 56 or 64 kbit/s.

FIG. 4 shows the linking of the modules and the various exits from the main programs.

Exit from the INIT module 33 triggers the T FOND module 30; the T FOND HV and T FOND BV modules 31 and 32 are selectively connected to the T FOND module 30. A first exit 34 from the module 30 triggers the module 31 when connection and detected high data rate are indicated (CNX+HV) on this exit 34; a second exit 35 of the module 30 triggers the module 32 when connection and the detected low data rate is indicated (CNX+BV) on this exit 35. A third exit 36 from the module 30 goes to the INIT module 33 when new interface programming parameters (MOD PROG) are present at this exit.

An exit 37 from each of the modules 31 and 32 enables triggering of the module 30 by a disconnection detected indication (DCNX) at this exit.

The three main programs or modules 30, 31 and 32 are interrupted by routines called by the serial interrupts INT SER and the timer interrupts INT TIM. These routines are included in other modules to be described in more detail later.

In the subsequent figures the flowcharts show the main actions effected by the program concerned together with the main decision operations which control the linking of successive actions. Each decision operation has a negative exit and a positive exit, the negative exit being denoted by a zero to represent logical inversion.

Figure 5:
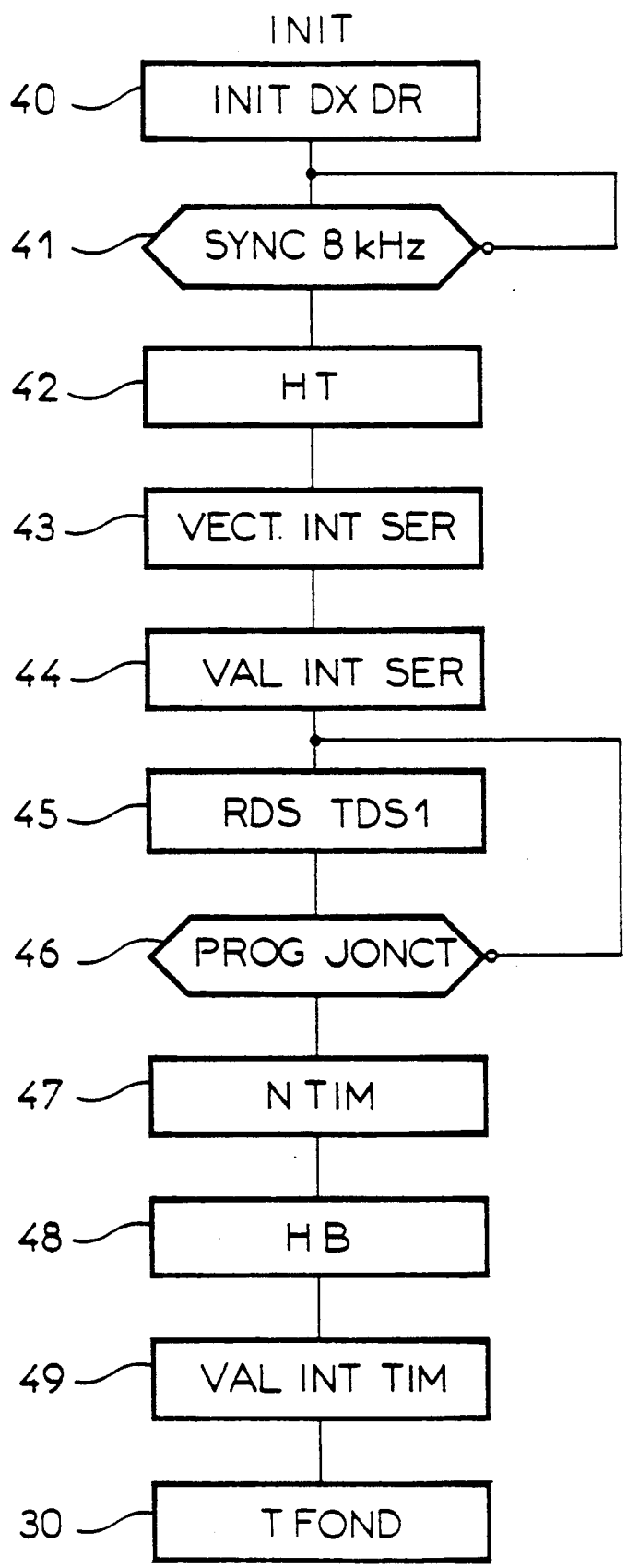
FIG. 5 shows the flowchart of an initialization program INIT of the processing software of the digital transmitter.

FIG. 5 shows the flowchart of the INIT module program 33.

The INIT program initializes the variables, synchronizes the serial ports DX, DR of the processor with the serial ports of the line interface circuit and generates the clock HB. The successive actions of this program and the decision operations which control them are as follows:

- 40: initializing the serial DX, DR data ports (INIT DX DR) to define the byte-level exchange mode at these ports,
- check if the 8 kHz system clock has been recovered (SYNC 8 kHz), this clock being obtained from the PABX and marked from the start bit of each message sent by the PABX, and
  - if this clock is not marked repeating the operation represented by looping its negative exit to its entry,
  - if the clock is marked going to the next stage (step 42),
- 42: synchronizing the serial ports DX, DR to the serial ports of the line interface (HT) so that the 8×256 kHz periods of the HT frame clock correspond to the 64 kbit/s channel of the line and so as to generate a DX, DR serial access interrupt every 125 μs after reception of the eight periods at 256 kHz of this clock HT,
- 43: "vectorizing" the serial interrupt (VECT INT SER) to process each serial interrupt at an address contained in a variable which is originally initialized by this action for processing the first interrupt and thereafter modified according to the processing in progress,
- 44: enabling serial interrupts (VAL INT SER),
- 45: processing the transmission/reception of the signalling codes (denoted RDS, TDS1) for the type of interface connected to the transmitter and declared by the PABX, this processing applying to the serial interrupts and enabling detection of interface parameters, essentially the type of interface connected and the transmit/receive speed of the connected terminal equipment,
- 46: verifying that the interface is programmed (PROG JONCT) to determine if the interface parameters have been received, and
  - if these parameters have not been received, repeating action 45 as represented by the loopback of the negative exit of this operation 46 to the entry of the action 45,
  - if these parameters are received, going to the next stage (step 46),
- 47: initializing the timer interrupt period (N TIM), the frequency of timer interrupts being twice the terminal transmit/receive frequency,
- 48: "vectorizing" the timer interrupts (HB) for processing of each successive timer interrupt at an address contained in a variable, this variable first being initialized by this action and then defined successively at the processing address of each current timer interrupt, so as to generate alternately the rising and falling edges of the clock HB, each timer interrupt generating in this way an edge of the clock HB and controlling also the timer interrupt which follows it and which generates the opposite sign edge,
- 59: enabling timer interrupts (VAL INT TIM) to enable the clock HB and,
- going to program T FOND of module 30.

Figure 6:
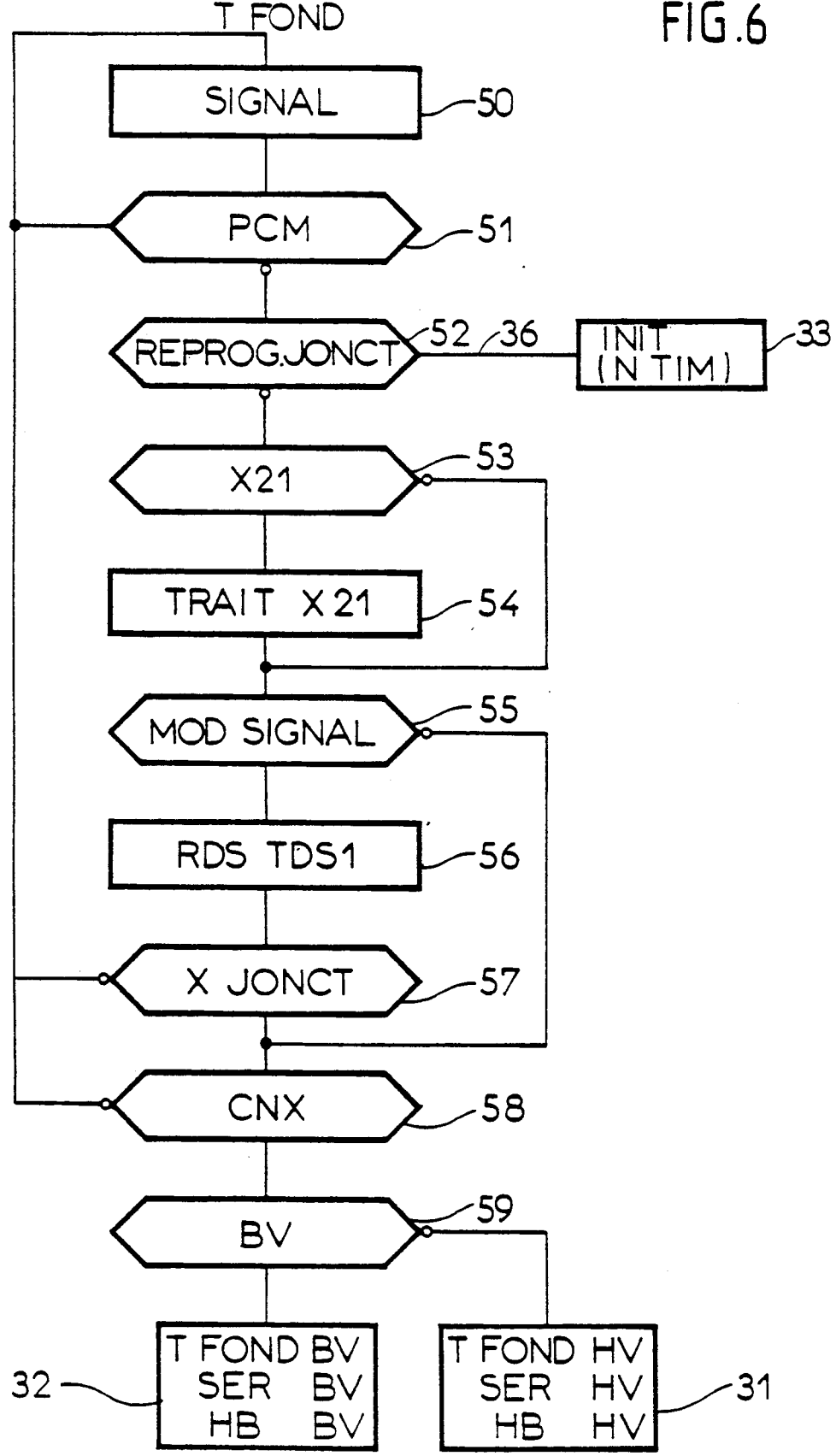
FIG. 6 shows the flowchart of a main program T FOND called the background task, for a non-connected mode of the digital transmitter.

FIG. 6 shows the flowchart of the program T FOND module 30 in FIG. 4.

This program T FOND controls the signalling codes transmitted in the signalling channel at 8 kbit/s, monitors the interchange circuits of the interface, monitors the switches 6A, 7A (FIG. 2) and detects connection of the terminal to the line.

Its successive actions and decision operations are as follows:

- 50: processing the transmission/reception of signalling codes (SIGNAL) to transmit to the PABX the status of the interchange circuits and switches and to receive the resulting commands and specific PCM loopback and interface reprogramming commands,
- 51: verifying if PCM loopback is applied (PCM) and
- if PCM loopback applies, looping to the entry of the previous action 50,
- if the loop PCM is not applied, verifying reprogramming of the interface (operation 52: REPROG JONCT) for possible new definition of the interface parameters, reprogramming of the detected interface causing an exit from the program T FOND (exit 36 in FIG. 4) and return to operation 47 (N TIM) of the INIT program in FIG. 5, and
- 53: if reprogramming is not detected, going to the next operation (operation 53),
- verifying the use of the X.21 interface (X21), and
- if the X.21 interface is used, processing the X.21 status according to CCITT Recommendation X.21 (operation 54: TRAIT X21) and going to the next operation (operation 55),
- 55: if the X.21 interface is not used, go direct to this next operation (operation 55),
- 56: verifying changes of state of the interchange circuits and/or switches (MOD SIGNAL), and
- if these states have changed, preparing transmission of the codes and transmitting them as signalling (RDS TDS1),
- 57: verifying their transmission (X JONCT), and
- 58: if these changes have not been transmitted, returning to the entry point of T FOND to repeat action 52,
- if these states did not change during operation 55 or if the changes of state were transmitted during operation 57, verifying the placing into memory of a connection indication derived from the signalling codes (CNX), and
- if no connection information is present, starting the program T FOND again by looping the negative exit from operation 58 to the entry to action 50,
- 59: if the connection information is memorized, verifying if the terminal transmit/receive speed is one of the low speeds (BV), and
- if it is one of the low speeds, selecting the program T FOND BV module 32 and "vectorizing" the serial interrupts and the timer interrupts for the low speed concerned, for processing by the programs SCR BV and HB BV,
- if it is not one of the low speeds, selecting the program T FOND HV module 32 and "vectorizing" the serial interrupts and the timer interrupts for the high speed concerned, for processing by the programs SER HV and HB HV.

Figure 7:
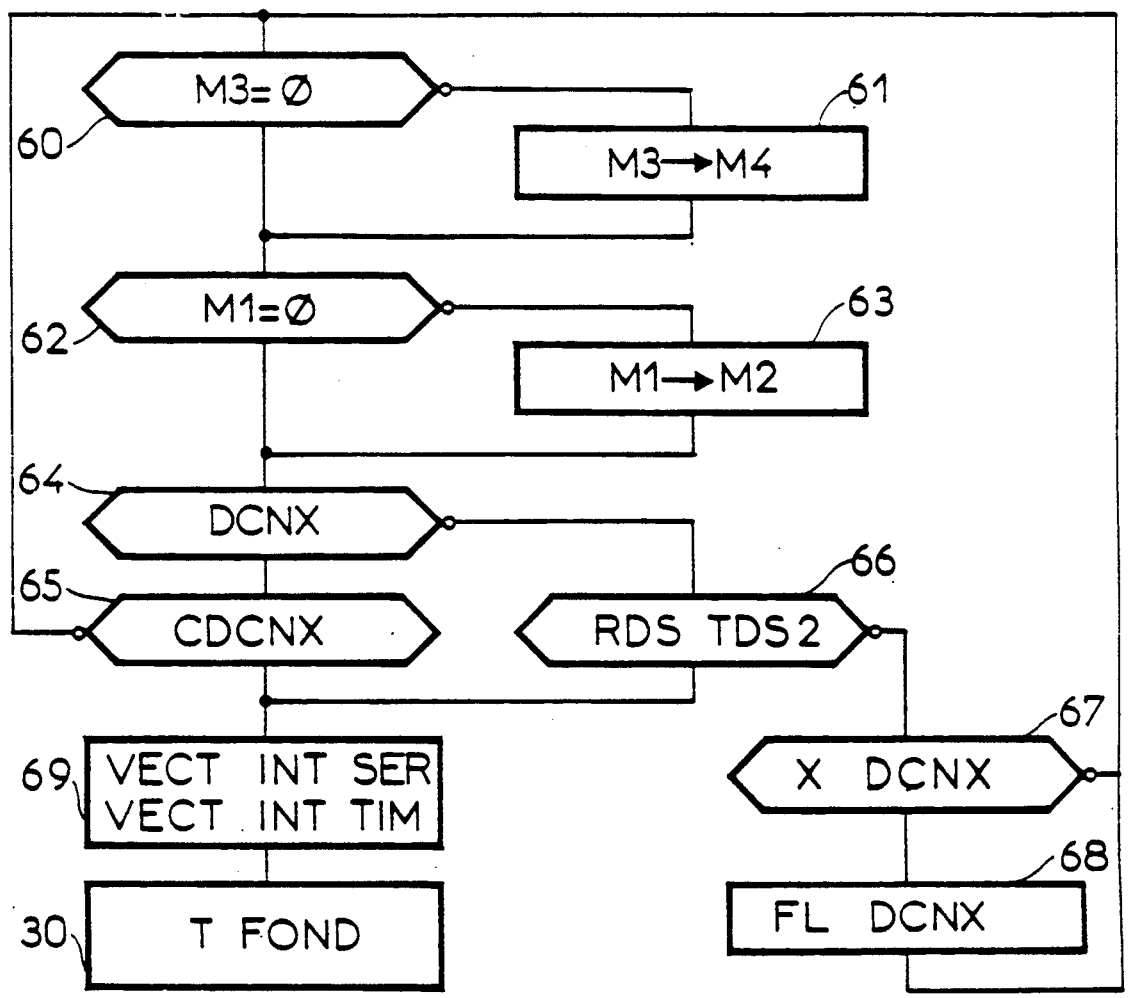
FIG. 7 shows the flowchart of another main program T FOND BV called the background task for low terminal equipment data rates, for a connected mode of the digital transmitter.

FIG. 7 shows the flowchart of the program T FOND BV module 32 from FIG. 4. This flowchart is described with reference to FIG. 8 showing the mode of coupling, especially at low speeds like these, between the D ports and the DX and DR ports of the processor (see FIG. 3).

The program T FOND BV transfers data between the D ports and the DX and DR ports using four FIFO (First IN First OUT) memories M1 through M4, framing data received from the terminal and to be transmitted over the line and carrying out the converse deframing in the opposite transmission direction, in accordance with CCITT Recommendation V.110 or the corresponding ECMA standard 102.

Figure 8:
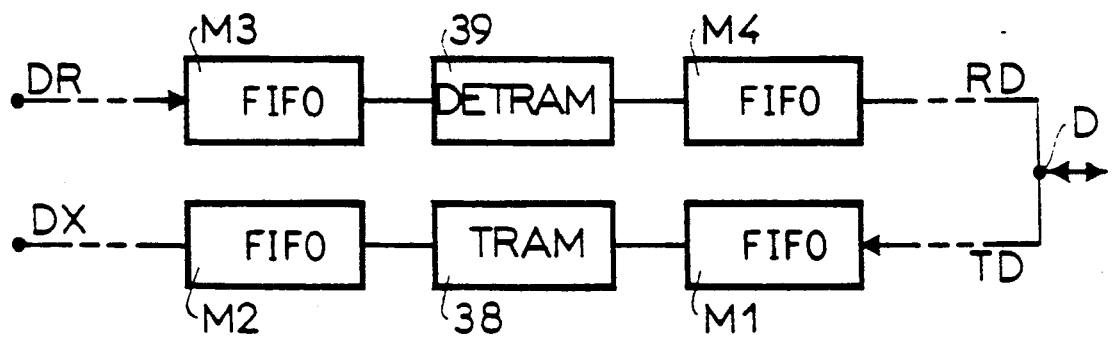
FIG. 8 is a schematic showing interfacing between terminal and digital line side ports of the digital transmitter.

Framing is effected when the data is transferred from the memory M1 connected to the D ports to the memory M2 connected to the DX port; it is symbolically represented in FIG. 8 by a module TRAM 38 located between these memories. Deframing is carried out when transferring the data from the memory M3 connected to the DR port to the memory M4 connected to the D ports; it is symbolically represented in FIG. 8 by a module DETRAM 39 situated between these two memories. The memories M1 through M4 have a capacity of 16 bits.

For low data rates up to 19 200 bit/s, framing in accordance with the V.110 standard is effected in ten bytes: the first and sixth bytes are characteristic of the V.110 frame, together with the first bit of each of the eight other bytes, the last bit of each of these eight other bytes indicating the status of certain interchange circuits. Framing defines 48 bit positions in the ten bytes which are assigned to the terminal equipment data to match the terminal equipment data rate to the 64 kbit/s line data rate.

The successive actions and operations of the program T FOND BV are as follows:

60: verifying if memory M3 is empty (M3=$\phi$), this memory having previously been filled under the control of the serial interrupt processing program SER BV, and 61: if the memory M3 is not empty, deframing according to the V.110 standard and loading the result into memory M4 (M3→M4), if the memory M3 is empty, going to the next operation (operation 62), 62 verifying if memory M1 is empty (M1=$\phi$), this memory have been filled previously under the control of the timer interrupt processing program HB BV, and 63: if the memory M1 is not empty, framing in accordance with the V.110 standard and loading the result of framing into memory M2 (M1→M2), if memory M1 is empty going the next operation (operation 64), 64: verifying if a disconnection procedure is in progress (DCNX), instigated by an interchange circuit or switch state change, and 65: if a disconnection procedure is in progress, verifying if the disconnection is terminated (C DCNX), by detection of the response or confirmation from the remote equipment through the PABX, or detection of a time-out, 66: if the disconnection procedure is not detected as in progress by operation 64, verifying the presence of a signalling disconnection code (RDS TDS2), and 67: if the disconnection code is not detected as present by operation 66, verifying again the status of the interchange circuits and the switches (X DCNX) in order to monitor any disconnection request from the terminal through one of the corresponding interchange circuits or emanating from the user via the switches, and if these states still do not indicate a disconnection procedure in progress, returning to the entry point of the program T FOND BV as reflected in the looping of the negative exit of operation 67 to the entry of operation 60, to ensure continuity of the program T FOND BV, 68: if these states indicate a disconnection procedure in progress, marking a disconnection flag (FL DCNX), which action is looped to the entry of the program T FOND BV, this disconnection flag enabling detection of a disconnection in progress during operation 64 and compliance with the V.110 standard disconnection procedure, 69: if the disconnection code is detected as present by operation 66 or if disconnection is detected as terminated by operation 65, managing the disconnection effected (VECT INT SER-VECT INT TIM), whereby the serial and timer interrupts are "vectorized" to enter program T FOND again, and executing the program T FOND module 30.

Figure 9:
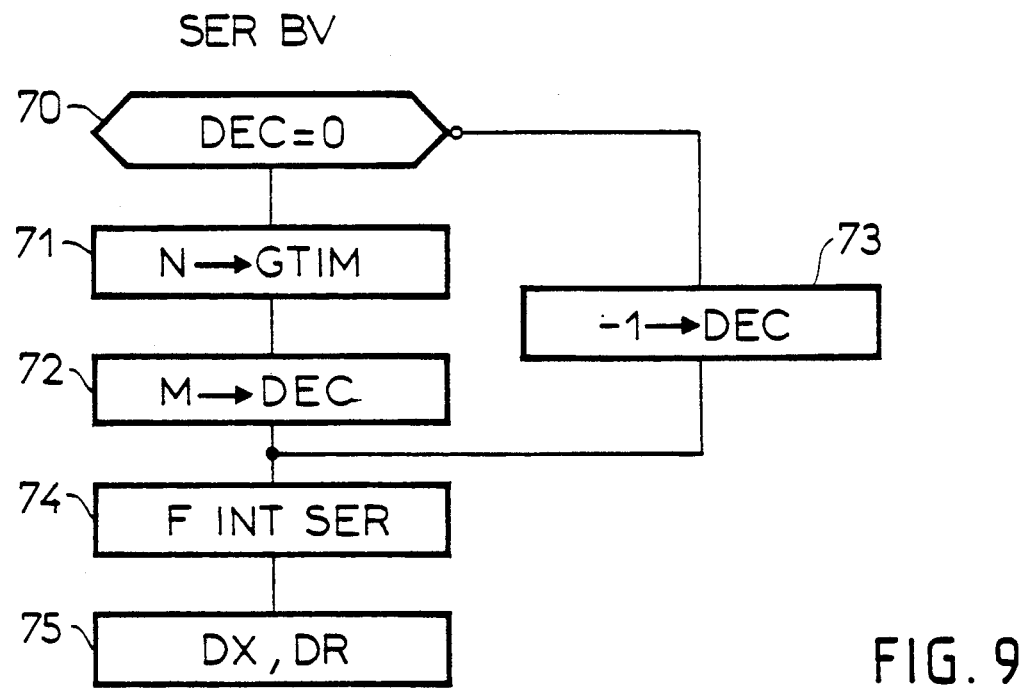
FIG. 9 shows the flowchart of a program SER BV for interrupting the program T FOND BV from FIG. 7.

FIG. 9 shows the flowchart of the program SER BV for processing the serial interrupts INTER SER for low data rates of terminal equipment connected to the synchronous digital transmitter.

The program SER BV periodically resynchronizes the clock HB to the clock HT and manages the serial ports DX, DR.

The HB/HT resynchronization period is derived previously in the program INIT from the period of the timer interrupts (action 47, FIG. 5); this gives the minimal number M of serial interrupts which corresponds to a number P of timer interrupts. Such resynchronization every M serial interrupt is effected when a serial interrupt counter reaches the zero state; this counter (DEC in the flowchart) is loaded with the value M each time its state reaches zero and is decremented by one unit by each new serial interrupt. When its state reaches zero it also reloads the value N into a timer interrupt generator counter G TIM connected to the fast clock H of the processor controlling it. The counters DEC and G TIM are internal to the processor but are not shown in FIG. 3; the counter DEC is managed by the program; the counter G TIM is decremented automatically by the clock H and reloaded with its period each time its state reaches zero. M is the resynchronization period of the counter DEC and N is the period of the counter G TIM.

The successive actions and decision operations of the program SER BV are as follows:

70: verifying if resynchronization is to be effected (DEC=0), depending on whether the zero state of the serial interrupt counter DEC is detected, and 73: if the counter DEC is not at zero, decrementing its state by one unit on each serial interrupt (−1→DEC) and going to the next action (action 74), 71: if the counter DEC is detected at zero, reloading the counter G TIM with its period N (N→G TIM), 72: reloading the counter DEC with its period M (M→DEC), 74: marking a serial interrupt flag (F INT SER), such marking of this flag corresponding to processing of the signalling codes, 75: transmitting/receiving data at the ports DX, DR (DX, DR), this action corresponding in FIG. 8 to the unloading of the framed data from the memory M2 for transmission on the line and to loading of the framed data received from the line into the memory M3, on the falling edges of eight pulses at 256 kHz of the clock HT in the case of unloading the memory M2 and on the rising edges in the case of loading the memory M3.

The program T FOND BV is returned to at the end of processing each serial interrupt.

With reference to this SER BV flowchart and to give an example for a 19 200 bit/s terminal equipment, for which the timer interrupt frequency is 38 500 Hz, five serial interrupts correspond to 24 timer interrupts, in other words M = 5 and P = 24.

Figure 10A:
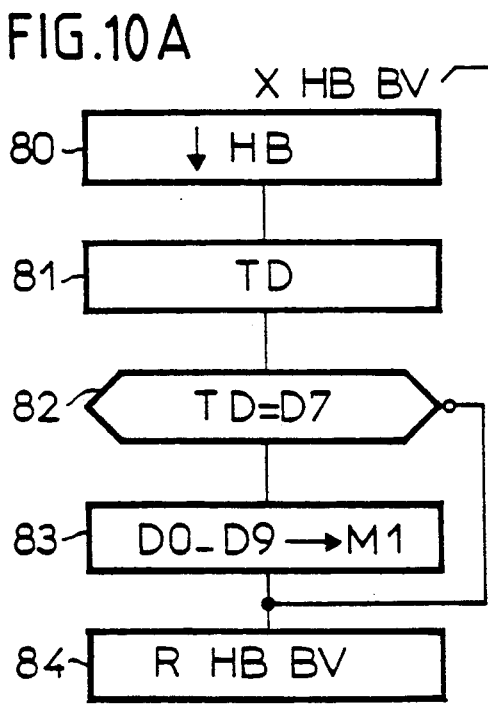
FIGS. 10A, 10B show the flowcharts of two further programs XHB BV and RHB BV which alternately interrupt the program T FOND BV.
Figure 10B:
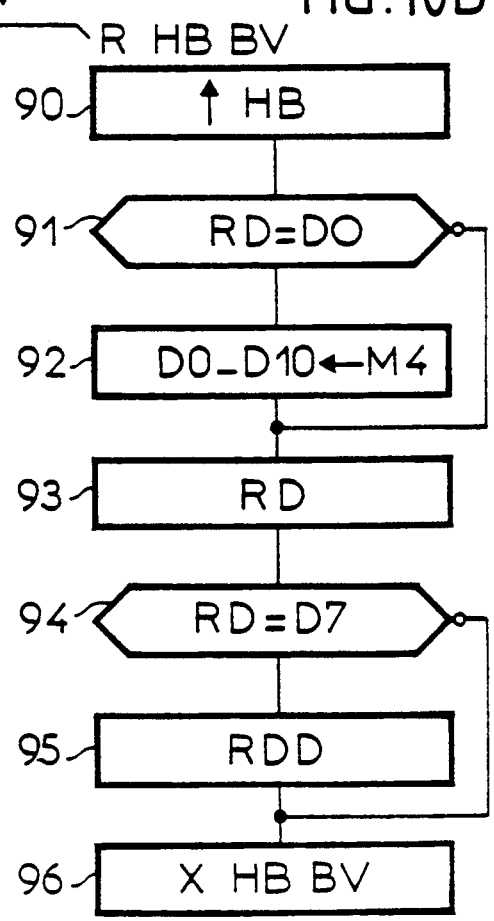

FIGS. 10A and 10B show the flowcharts of two subroutines X HB BV and R HB BV called alternately. They are successive timer interrupt processing routines, executed alternately and in combination constituting the low data rate timer clock program HB BV.

The two subroutines of the program HB BV generate successive edges of the clock HB on the timer interrupts and transmit data TD, RD in both directions between the processor and the terminal equipment. The program is described with reference also to FIG. 8 showing the two memories M1 and M4 that it uses for the recovery of the data TD transmitted by the terminal which is loaded into the memory M1 and transmission of the data RD to the terminal, which is read in the memory M4. The memory M1 is loaded with words of ten bits D0–D9 each comprising a data byte TD (D0–D7) and two interchange circuit status bits (circuits 108 and 105—FIG. 2) derived from sampling the transmit circuits at the D ports. The memory M4 is read in words of eleven bits D0–D10 made up of a data byte RD and three interchange circuit status bits (circuits 106, 107 and 109) transmitted on the receive circuit to the D ports and to the interchange circuits.

The successive actions and decision operations of the subroutine X HB BV from FIG. 10A processing a timer interrupt giving rise to a falling edge of the clock HB are as follows:

80: generating the falling edge of the clock HB (↓HB), the generation of this clock edge being derived, for the first timer interrupt, from the "vectorization" of the timer interrupts effected in the program T FOND (FIG. 6, action 32) and, for subsequent interrupts, from the "vectorization" effected by the subroutine R HB BV from FIG. 10B, 81: sampling the transmit circuit at the D ports on this clock edge (TD), 82: verifying if this sampled bit is the eighth bit of a byte D0–D7 being formed (TD=D7), and 83: if this bit is the eighth bit, loading the prepared byte D0–D7 and two interchange circuit status bits into memory M1 (D0–D9→M1), 84: if this bit is not the eighth bit or after loading of the memory M1, "vectorizing" processing of the next timer interrupt to subroutine R HB BV (R HB BV).

The program T FOND BV is returned to after processing this timer interrupt, which is the one which triggers the subroutine X HB BV.

The successive actions and the decision operations of the subroutine R HB BV from FIG. 10B, processing the timer interrupt following that processed by the subroutine X HB BV and producing a rising edge of the clock HB, are as follows:

90 generating the rising edge of the clock HB (↑HB), this action resulting, like action 80 from FIG. 10A, from the "vectorization" of the timer interrupts in the subroutine X HB BV, 91: verifying if the bit to transmit RD is the first bit of a new data bit to transmit to the terminal (RD=D0), and 92 if this bit is the first of a new byte to transmit, reading a word containing it from the memory M4 (D0–D10←M4), 93: transmitting one bit (RD), 93: if this bit to transmit is not the first of a new byte to transmit, transmitting this bit of the read word (RD), as reflected in the negative exit from operation 91 connected to the entry to action 93, 94: verifying if the bit transmitted is the eighth bit of the byte to transmit to the terminal (RD=D7), and 94: if this bit is the eighth bit of the data byte, transmitting the interchange circuit status (RDD), 96: if the bit transmitted is not the eight bit or after action 94, vectorizing the processing of the next timer interrupt to subroutine X HB BV (X HB BV).

The program T FOND BV is returned to at the end of processing this timer interrupt, which is the one which triggers the subroutine R HB BV.

Figure 11:
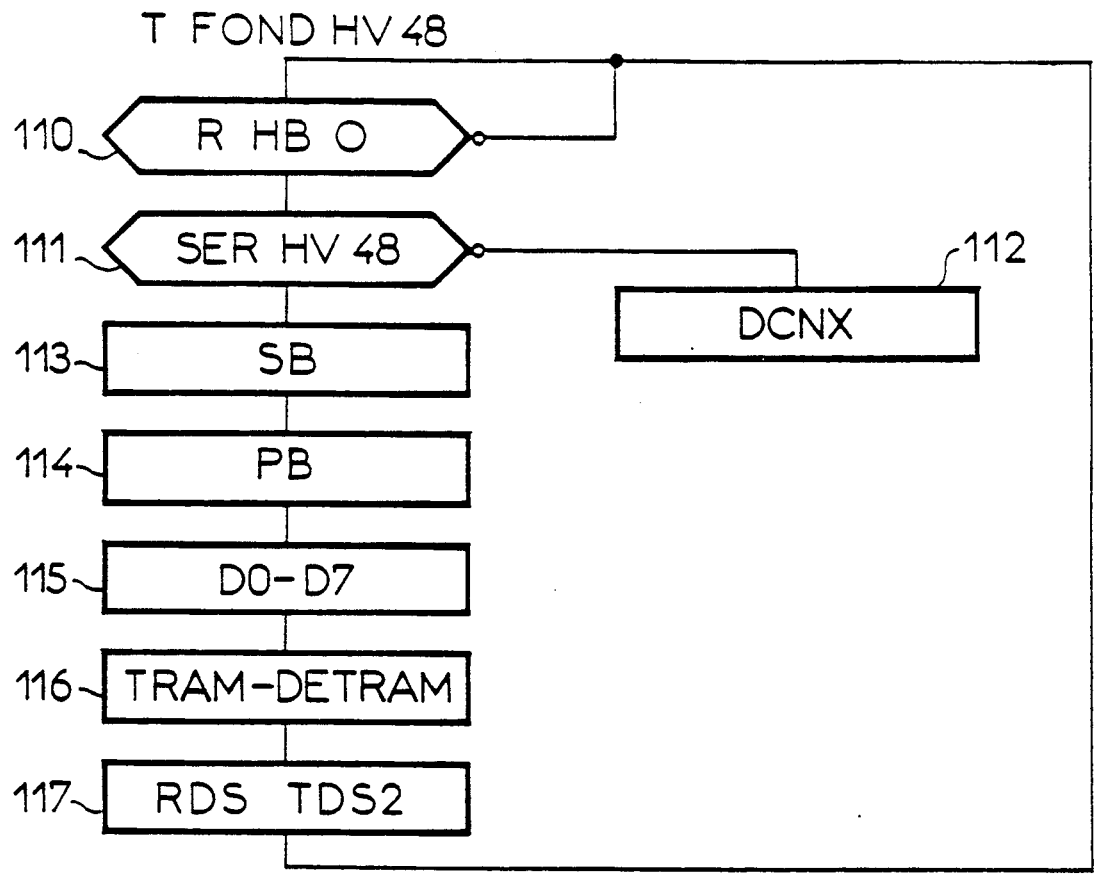
FIG. 11 shows the flowchart of another main program T FOND HV 48 called the background task for a first terminal equipment high data rate, for a connected mode of the digital transmitter.

FIG. 11 shows the flowchart of the program T FOND HV 48 module 31 from FIG. 4.

This program prepares transfers between the D ports and the DX and DR ports by framing and conversely deframing the data in accordance with the V.110 standard for the 48 kbit/s data rate of the terminal equipment connected to the digital transmitter.

For the 48 kbit/s data rate, this framing according to the V.110 standard is effected by successive bytes D0–D7 each formed of six data bits accompanied by a synchronization prefix bit PB characteristic of framing and a suffix bit SB characteristic of framing and/or the status of the connection (circuit 103). Consequently, it matches the data rate of the terminal equipment (48 kbit/s) to the line data rate (64 kbit/s) for transparent transmission of the data RD, TD.

The successive actions and decision operations of the program T FOND HV 48 are as follows:

110 verifying if the processing of the first timer interrupt which follows the serial interrupt and which generates the rising edge of the clock HB HV transmitting one bit to the terminal has been done (R HB0), the negative exit of this operation being looped to its entry to repeat the operation, the subroutine R HB HV being explained hereinafter, and 111: if the first timer interrupt has been processed, verifying if the serial interrupt has been processed (SCR HV 48), this processing being done by the program SER HV 48 described below, the absence of any such serial interrupt which has not triggered its corresponding processing being indicative of disconnection of the remote terminal equipment, and 112: if this serial interrupt has not been processed, disconnecting the terminal (DCNX) after a time-out, 113: if the serial interrupt has been processed, preparing the eighth bit (SB) of the byte being formed, the SB bit depending on the status of the interchange circuit and being derived by sampling the status of interchange circuit 105 or 108 (FIG. 2), 114: preparing the first bit (PB) of the byte following that being formed, this bit being characteristic of the framing, 115: processing the byte received at the time of the serial interrupt (D0-D7) to verify the presence of the V.110 frame synchronization bit PB and the value of the SB bit, 116: managing the successive framing and deframing phases according to the V.110 standard procedure for the 48 kbit/s data rate (TRAM-DETRAM), 117 managing the status of the switches 6A, 7A and the interchange circuits (RDS TDS2) for subsequent transmission.

The program T FOND HV 48 loops on itself continuously.

Figure 12:
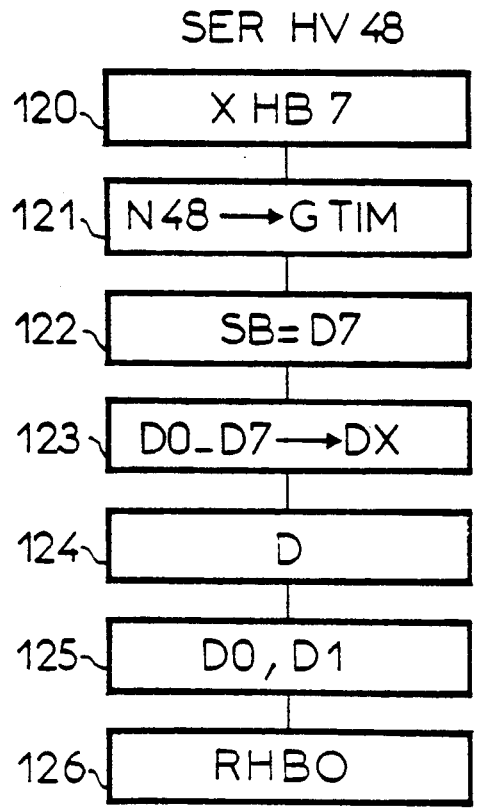
FIG. 12 shows the flowchart of a program SER HV 48 for interrupting the program T FOND HV 48.

FIG. 12 shows the flowchart of the program SER HV 48 processing serial interrupts for this 48 kbit/s data rate. It resynchronizes the clock HB to the clock HT by generating a falling edge of the clock HB, framing according to the V.110 standard for the 48 kbit/s data rate and management of the digital line transmission serial ports DX, DR.

The clock HB is resynchronized on each serial interrupt, the time interval between two serial interrupts corresponding to twelve timer interrupts with a frequency 96 000 Hz; it is effected by replacing the twelfth timer interrupt by the serial interrupt which arrives using a counter G TIM generating the timer interrupts at frequency 96 000 Hz. This timer is internal to the processor and counts a number N48 of pulses of the fast clock H of the processor. The number N48 is the period of this counter.

The successive actions of the program SER HV 48 are as follows:

120: generating a falling edge of the clock HB (X HB7),

121: reloading the counter G TIM with its period N48 (N48→G TIM) for the theoretical generation of twelve timer interrupts, as will be explained with reference to FIG. 17, 122: adding the eighth SB bit to the byte being formed (SB=D7), 123: transmitting this byte D0-D7 to the serial ports DX and receiving the byte from the serial port DR (D0-D7 →DX), 124: sampling the D ports to recover the TD bit (D), 125: placing the PB and TD bits at the respective positions D0 and D1 of the new byte being formed (D0, D1), 126: vectorizing the next timer interrupt to a program R HBO containing the variable for vectorizing the next timer interrupt for the program SCR HV 48 (R HBO), as explained with reference to FIG. 17.

The program T FOND HV 48 is returned to at the end of this processing.

Figure 13:
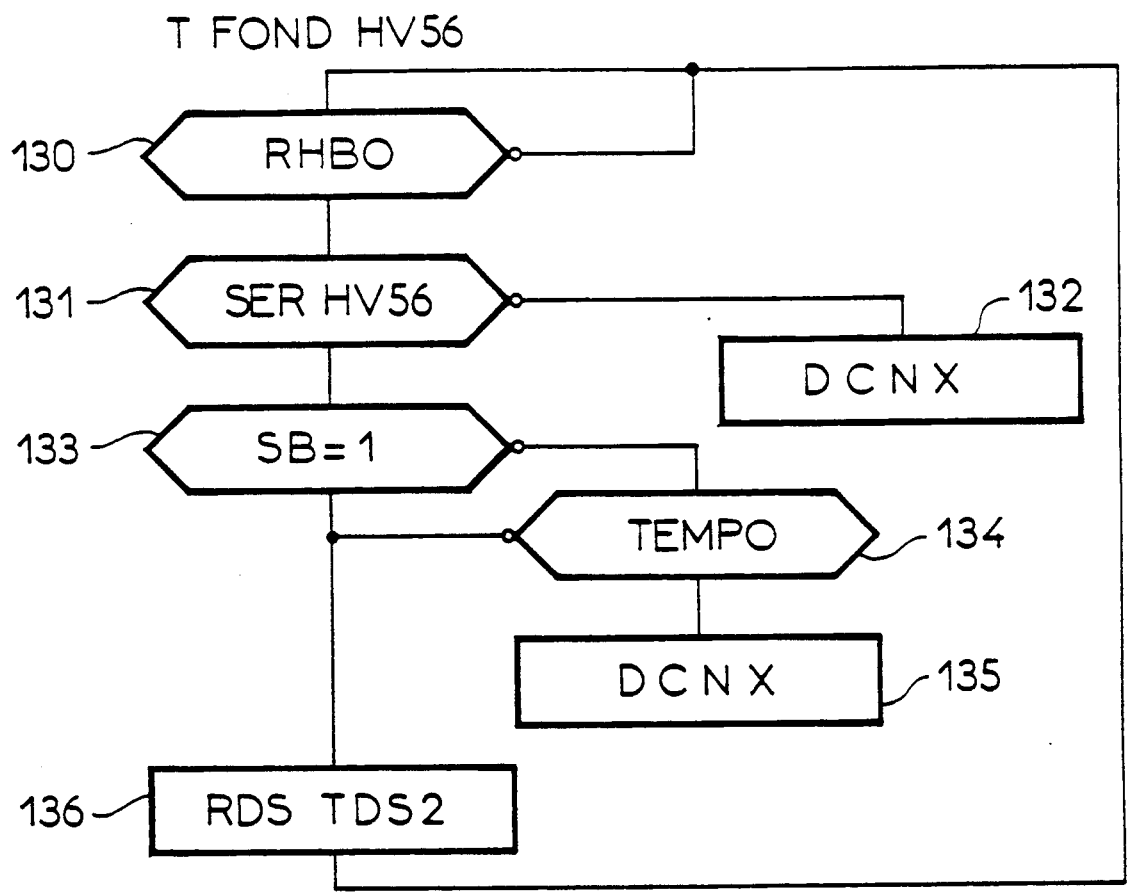
FIGS. 13 and 14 are flowcharts of programs corresponding to those of FIGS. 11 and 12 for a second value of the terminal equipment high data rates.

FIG. 13 shows the flowchart of the program T FOND HV 56 module 31 from FIG. 4 for the 56 kHz data rate of the terminal equipment connected to the synchronous digital transmitter.

The program T FOND HV 56 simply monitors the status of the switches and the interchange circuits to define the status of the interface (disconnection and loopback requests). It also watches out for the presence of a synchronization bit SB, as explained later.

The program SER HV 56 effects the change of data rate on successive bytes D0-D7 each formed of seven data bits accompanied by a synchronization suffix bit SB, with SB=1 for transparent data transmission.

The actions and the decision operations of the program T FOND HV 56 are as follows:

130: verifying if the first timer interrupt following the serial interrupt and which generates the rising edge of the clock HB HV for transmission of bits to the terminal has been processed (R HBO), the negative exit from this operation being looped to its entry to reflect the repeating of this operation, and 131: if the first timer interrupt has been processed, verifying if the serial interrupt has been processed (SER HV 56), in the manner explained with reference to FIG. 14, and 132: if the serial interrupt has not been processed, disconnecting (DCNX) in a manner analogous to action 112 from FIG. 11, 133: if the serial interrupt has been processed, verifying that the suffix bit of a received byte is indicative of synchronous V.110 framing at 56 kbit/s (SB=1), and 134: if SB is not equal to 1, verifying a time-delay (TEMPO) initiated by each serial interrupt, this time-delay of approximately 3 ms being indicative of disconnection of the remote equipment, and 135: if the time-delay has run out, disconnecting (DCNX) in a manner analogous to the action 132, 136: if SB=1, managing the status of the switches and the interchange circuits (RDS TDS2) for their transmission as signalling.

The program T FOND HV 56 loops on itself continuously.

Figure 14:
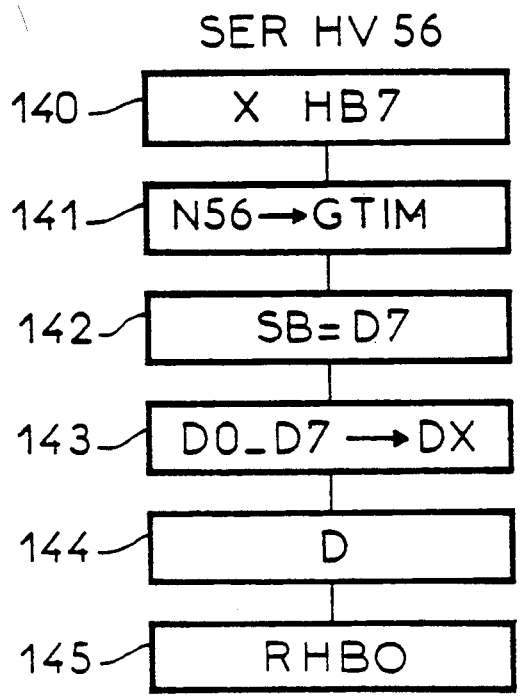

FIG. 14 shows the flowchart of the program SER HV 56 processing serial interrupts for the 56 kbit/s data rate of the terminal equipment. It resynchronizes the clock HB to the clock HT, carries out framing in accordance with the V.110 standard for the 56 kbit/s data rate and manages the serial ports DX and DR for transmission/reception over the digital line.

The clock HB is resynchronized on each serial interrupt, the time interval of 125 µs between two serial interrupts representing in this case fourteen timer interrupts with a frequency of 112 kHz; resynchronization is effected by replacing the fourteenth timer interrupt with the arriving serial interrupt. The program uses a counter G TIM internal to the processor to generate the timer interrupts, counting a number N56 of pulses of the fast clock H of the processor. This number N56 is the period of the counter G TIM for this program.

The successive actions of the program SER HV 56 are as follows:

140: generating a falling edge of the clock HB (X HB7),

141: loading the counter G TIM with its period N56 (N56→G TIM) for the theoretical generation of fourteen timer interrupts, as explained with reference to FIG. 17, 142: adding the suffix bit SB to the byte being formed (BS=D7), 143: transmitting the byte to the serial port DX and recovering the byte from the serial port DR (D0-D7→DX), 144: sampling the ports D to recover the first bit TD of a new byte (D), 145: "vectorizing" the next timer interrupt to a program R HBO containing the variable for vectorizing the next timer interrupt for the program SER HV 56 (R HBO), as explained with reference to FIG. 17.

The program T FOND HV 56 is returned to at the end of the processing.

Figure 15:
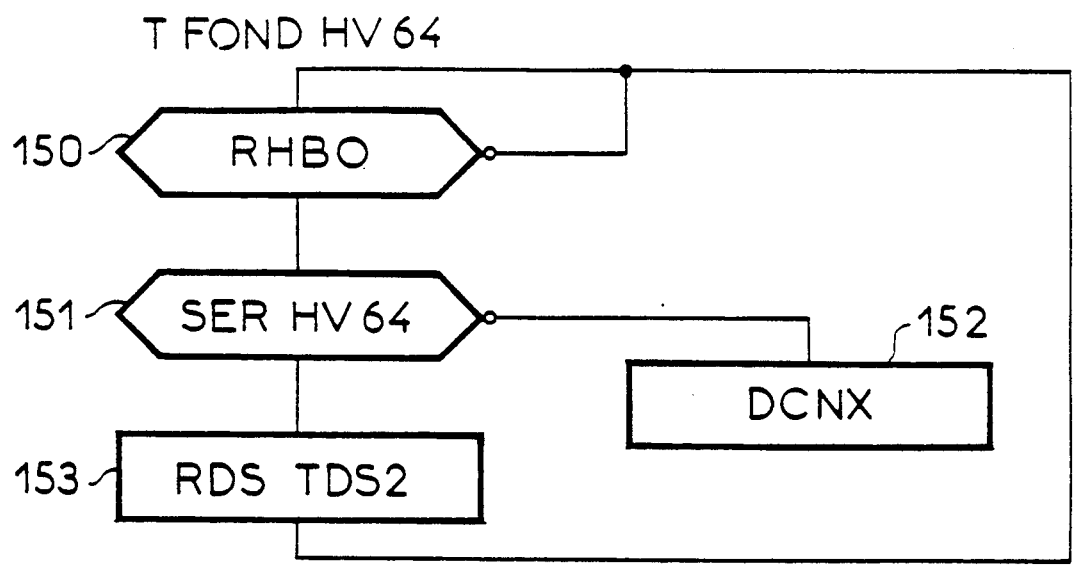
FIGS. 15 and 16 are flowcharts of programs corresponding to those of FIGS. 11 and 12 for a third value of the terminal equipment high data rates.

FIG. 15 shows the flowchart of the program T FOND HV 64 module 31 from FIG. 4 for the 64 kbit/s terminal equipment data rate. It merely monitors the status of the interchange circuits and switches.

Figure 16:
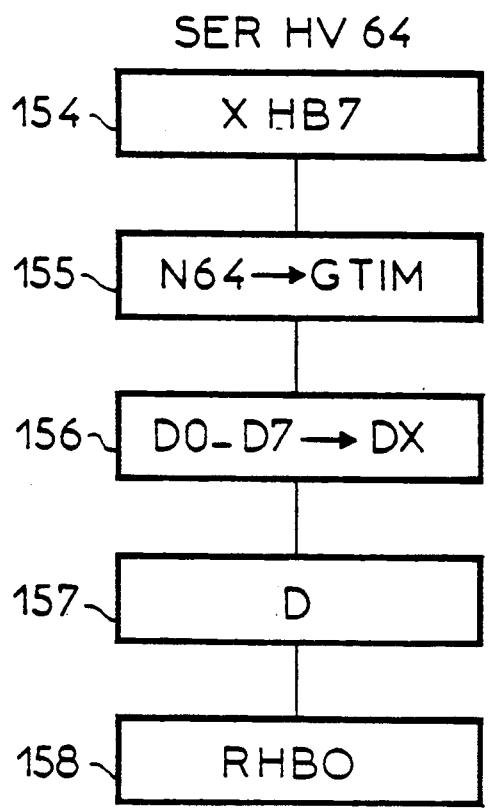

The actions and decision operations of the program T FOND HV 64 are as follows:

150: verifying if the processing of the first timer interrupt which follows the serial interrupt and which generates the corresponding rising edge of the clock HB HV for transmitting bits to the terminal has been processed (R HBO), the negative exit from this operation looped to its entry reflecting the repeating of the operation until the timer interrupt has been processed, and 151: if the timer interrupt has been processed, verifying (SER HV 64) if the serial interrupt has been processed by the program SER HV 64 described with reference to FIG. 16, and 152: if the serial interrupt has not been processed, disconnecting (DCNX);

153: if the serial interrupt has been processed, managing the status of the switches and the interchange circuits (RDS TDS2), for their transmission as signalling if a change is indicative of a requested disconnection.

The program T FOND 64 loops on itself continuously.

FIG. 16 shows the flowchart of the program SER HV 64 for processing serial interrupts for the 64 kbit/s data rate; it resynchronizes the clock HB to the clock HT and transmits data from the terminal equipment transparently on the line.

The clock HB is synchronized on each serial interrupt, the interval between two serial interrupts representing sixteen successive timer interrupts. Synchronization is effected by replacing the sixteenth timer interrupt with the arriving serial interrupt. The program uses a counter G TIM generating the timer interrupts by counting a number N64 of pulses of the fast clock H of the processor. The number N64 is the period of the counter G TIM.

Figure 17:
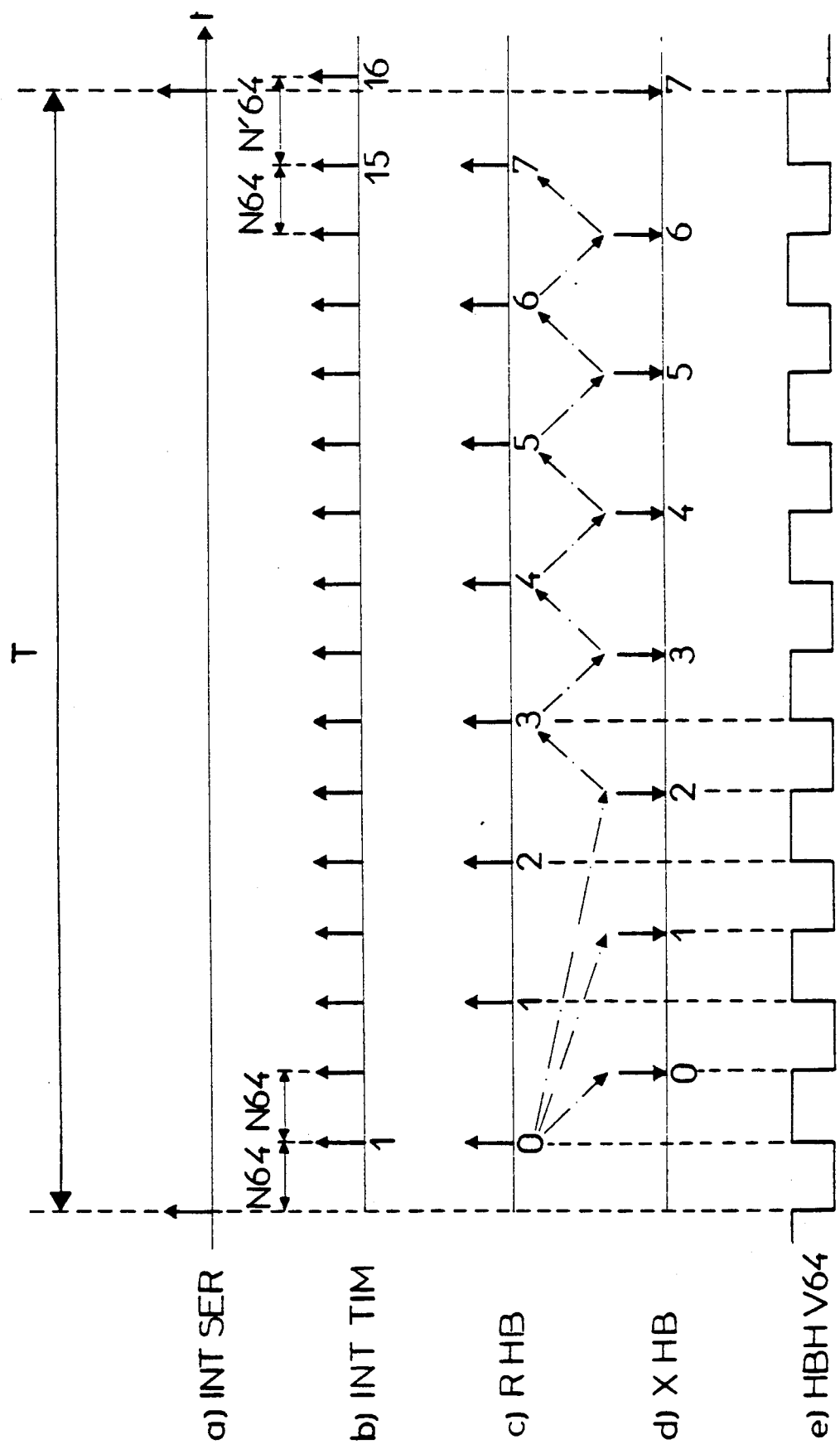
FIG. 17 is a diagram explaining programs corresponding to those of FIGS. 10A and 10B but for the three values of the terminal equipment high data rates.

The successive actions of the program SER HV 64 are as follows:

154: generating a falling edge of the clock HB (X HB7),

155: loading the counter G TIM with its period N64 (N64→G TIM), for the theoretical generation of sixteen timer interrupts in 125 μs, 156 transmitting the byte D0-D7 to the DX ports and recovering the byte from the DR ports (D0-D7→DX), 157: sampling the D ports to recover the first bit TD of a new byte (D), 158: vectorizing the next timer interrupt to a program R HBO for this program SER HV 64 (R HBO), as explained in FIG. 17.

The program T FOND HV 64 is returned to at the end of this processing.

The diagrams in FIG. 17 relate to the various programs which process timer interrupts, to illustrate processing at the 64 kbit/s data rate. The processing at the 48 and 56 kbit/s data rates is also explained with reference to these diagrams. The diagrams show:

a) the generation of serial interrupts INT SER with the period T=125 μs, b) the generation of the successive timer interrupts INT TIM by the counter G TIM, with the period N64 for the fifteen timer interrupts 1 through 15 following each serial interrupt and the period N'64 for timer interrupt 16, where N64=T/16 and N'64 is slightly greater than T/16, c)/d) the alternate generation of eight rising edges R HB and seven falling edges X HB of successive timer interrupts, these edges being denoted R HB0-7 and X HB0-7 for the frame bytes transmitted in both directions between the terminal and the processor, with the eighth falling edge X HB7 generated by the serial interrupt, e) the corresponding clock HB HV 64.

The falling edge X HB7 is derived from the serial interrupt which replaces the delayed timer interrupt 16. It is locked onto the serial interrupt for resynchronizing the clock HB to the serial interrupt and therefore to the clock HD.

These diagrams show that the clock HB HV 64 is obtained from subroutines R HB and X HB which are called alternately to process the successive timer interrupts. Each of these subroutines generates a rising or falling edge of the clock HB and transmits or samples the corresponding data bit of each byte. The stringing of the programs which process timer interrupts results from the vectorization of the timer interrupts for the bit rate concerned.

The R HB programs processing transmission of data to the terminal comprise:

a program R HB0 called by the variable defined initially when vectorizing timer interrupts for the data rate in question; this program is specific to each of the possible data rates (64, 56, 48 kbit/s); it vectorizes the processing of the next timer interrupt to the program X HB0 for 64 kbit/s, to the program X HB1 for 56 kbit/s and to the program X HB2 for 48 kbit/s, as shown by the chain-dotted arrows linking programs c) and d), a program or processing routine R HBn where n takes the value 0, 1 or 2 according to the three possible values of the data rate, up to six, which vectorizes the processing a program R HB7 which modifies the theoretical period N64, N56 or N48 of the G TIM counter to extend it.

The X HB programs processing reception of data transmitted by the terminal comprise:

a program or routine X HBn which is called for the first to be executed, X HB0 or X HB1 or X HB2 according to the data rate, by the program R HB0 and which vectorizes the processing of the next timer interrupt to R HBn+1, that is R HB1 or R HB2 or R HB3 up to R HB7.

It will also be understood from these diagrams, and from that the serial interrupt replaces the last timer interrupt, that the action of reloading the counter G TIM with its theoretical period N64, N56 or N48, as appropriate, is made necessary by the previous modification done by the program R HB7.

The FIG. 17 diagrams also show that the clock HB HV 48 is obtained by processing eleven timer interrupts and the serial interrupt which replaces the twelfth timer interrupt, and that the clock HB HV 56 is obtained by processing thirteen timer interrupts and the serial interrupt which replaces the fourteenth timer interrupt.

There is claimed:

1. Synchronous digital transmitter for transmitting data over a digital transmission line between a terminal equipment having a standardized interface circuit and a multiservice digital PABX accessing a public switched telephone network, the digital transmitter comprising:

a line interface circuit for modulating and demodulating digital signals transmitted on said digital transmission line;

a multiplexing circuit interfaced to said line interface circuit for multiplexing and demultiplexing signals in the various channels of the digital transmission line for half-duplex exchange of messages within a 125 µs frame, one of said channels being a signalling channel and another being a 64 kbit/s data transmission channel;

means for producing a frame clock defining said 64 kbit/s channel of the digital transmission line;

means for processing data and signalling for their transmission in both directions to the PABX over the digital line and to the terminal equipment, in which the digital transmitter includes:

a V.24 socket and an X.21 socket for selective connection to said transmitter of one of the V.24, V.35/V.24, X.21 interfaces of terminal equipments with different standardized data rates;

means for generating a bit clock at a frequency very slightly greater than that of the data from the terminal equipment connected to the transmitter and the rising edges of which control the transmission of data in one direction and the falling edges of which control transmission of data in the other direction between the digital transmitter and the equipment; and means for synchronizing said bit clock to said frame clock with a synchronization period derived from the data rate of the terminal equipment connected relative to the frame clock frequency, the corresponding edge of the bit clock being resynchronized relative to the frame clock in each synchronization period, wherein said means for generating said bit clock comprises: first means for generating timer interrupts at a frequency slightly greater than twice that of the connected terminal equipment data, and second means for processing said timer interrupts and generating the successive opposite direction edges of said bit clock on said successive timer interrupts, with the processing of one of said timer interrupts generating one of the edges of said bit clock and controlling the processing of the timer interrupt which follows it and which generates the next opposite direction edge of said bit clock, and wherein said means for synchronizing said bit clock to said frame clock comprises:

third means for generating serial interrupts after each pulse defining the 64 kbit/s channel of said frame clock, said serial interrupts having a period of 125 µs, and fourth means for processing said serial interrupts responsive to the first coincidence between one of said serial interrupts and one of said timer interrupts by forcing the generation of the corresponding edge of said bit clock.

2. Synchronous digital transmitter according to claim 1 wherein said first, second, third and fourth means are implemented by a processor having serial ports interfaced to said line via said multiplexing circuit and said line interface circuit and managed by said fourth means for processing serial interrupts for the transmission of data and signalling codes on the line and ports interfaced to the connected terminal equipment and to its interface circuit and managed by said second means for processing timer interrupts for the transmission of data and the status of interchange circuits of the interface in both directions between the terminal equipment and the processor.

3. Synchronous digital transmitter according to claim 2 further comprising fifth means associated with said second and fourth means for transferring data between said ports and said serial ports, carrying out framing and complementary deframing according to the transfer direction, to match standardized data rates of the data below 64 kbit/s to the 64 kbit/s line data rate.

4. Synchronous digital transmitter according to claim 3 further comprising sixth means for monitoring signalling codes and interchange circuit status information and specific loopback and connection/disconnection control switches, said sixth means being interfaced to said fifth means and commanding with means on detection of connection information in the codes and status information that they monitor.

5. Synchronous digital transmitter according to claim 4 wherein said fourth means for processing serial interrupts and said second means for processing timer interrupts are specific to predetermined different ranges of standardized data rates selected by a selection operation internal to said sixth means.

6. Synchronous digital transmitter according to claim 5 wherein said fourth means for processing serial interrupts specific to a range of low data rates comprise a first serial interrupt counter having a counting period M and a second timer interrupt counter-generator interfaced to a fast clock and having a counting period N where M is the minimal number of serial interrupt corresponding to P timer interrupts, substantially at the period N, and defining the period for synchronizing the bit clock to the frame clock, said first counter controlling generation of the Pth timer interrupt on detection of the Mth serial interrupt.

7. Synchronous digital transmitter according to claim 5 wherein said fourth means for processing serial interrupts specific to a range of standardized high data rates of data for which the serial interrupt period corresponds to an integer number of timer interrupts comprise a timer interrupt counter-generator interfaced to a fast clock for counting pulses of said fast clock and the counting period of which is loaded on each serial interrupt with a defined value corresponding to the generation of the integer number of timer interrupts in each serial interrupt period and is modified, to extend it, by said second means for processing timer interrupts when said second means processes the penultimate timer interrupt in each serial interrupt period.

* * * * *